March 16, 1926.
H. S. WELCH, JR
1,577,395
AUTOMATIC SCALE
Filed Sept. 28, 1925  3 Sheets-Sheet 1
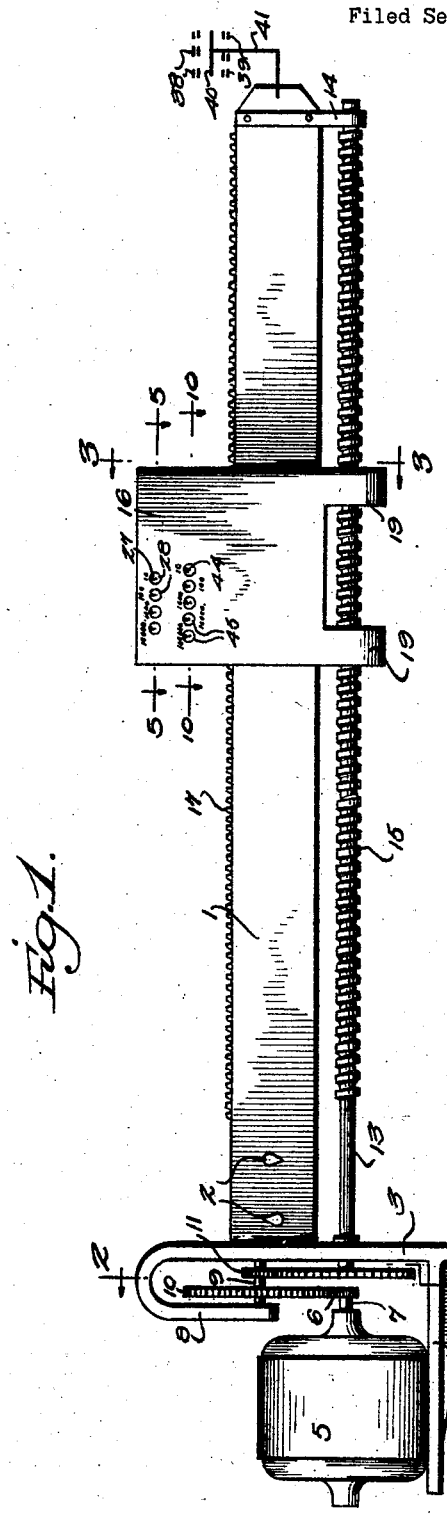
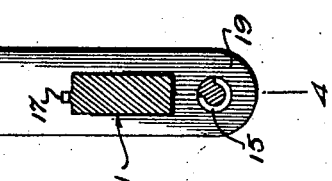
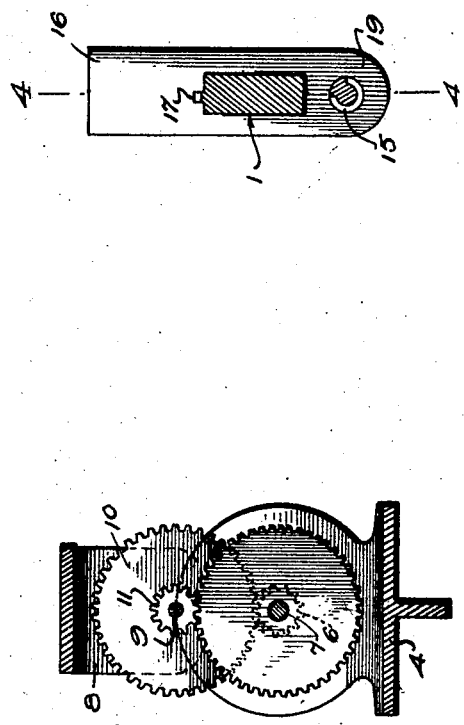
Inventor
Harvey S. Welch, Jr.
Attorney March 16, 1926.  
H. S. WELCH, JR  
AUTOMATIC SCALE  
Filed Sept. 28, 1925

1,577,395

3 Sheets-Sheet 2

Inventor  
Harvey S. Welch Jr.

By  
Attorney

March 16, 1926.  1,577,395

H. S. WELCH, JR
AUTOMATIC SCALE
Filed Sept. 28, 1925   3 Sheets-Sheet 3

Inventor
Harvey S. Welch Jr.
By
C. H. Parker
Attorney

Patented Mar. 16, 1926.

1,577,395

UNITED STATES PATENT OFFICE.

HARVEY SIMONS WELCH, JR., OF CHARLESTON, SOUTH CAROLINA.

AUTOMATIC SCALE.

Application filed September 28, 1925. Serial No. 59,188.

*To all whom it may concern:*

Be it known that I, HARVEY S. WELCH, Jr., a citizen of the United States, residing at Charleston, in the county of Charleston and State of South Carolina, have invented certain new and useful Improvements in Automatic Scales, of which the following is a specification.

This invention relates to scales and more particularly to automatic scales.

An object of the invention is to provide a scale in which movement of the weight on the beam automatically indicates and totals the amount weighed.

A further object is to provide indicating and totalizing mechanism consisting of two trains of gears, the indicating gears being actuated by movement of the weight in either direction whereby the weight of the material on the scale may be ascertained from the indicating mechanism at any time, and the totalizing mechanism being actuated by movement of the weight in one direction only.

A further object of the invention is to provide a construction in which a rack is arranged on the scale beam to actuate the gears of the indicating and totalizing gear trains.

Figures 4, 5, 6:
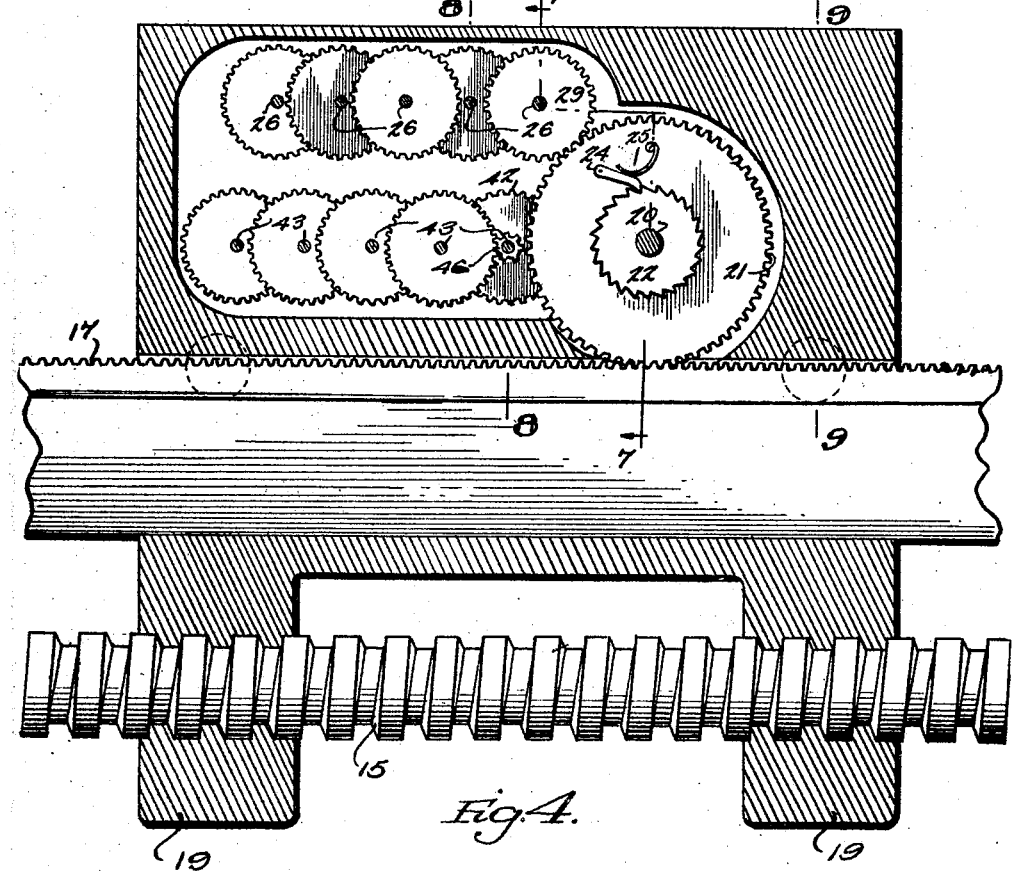
Figure 7:
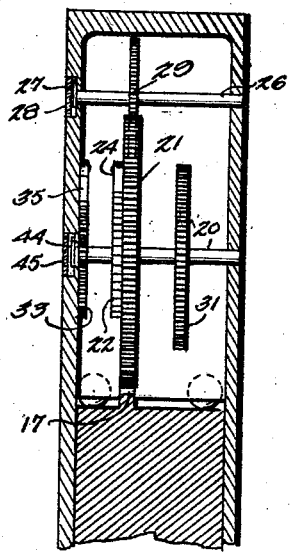
Figure 8:
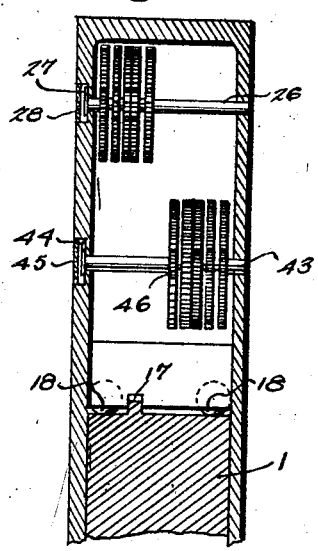
Figure 9:
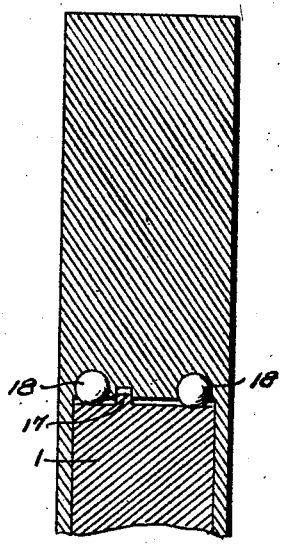
Figure 10:
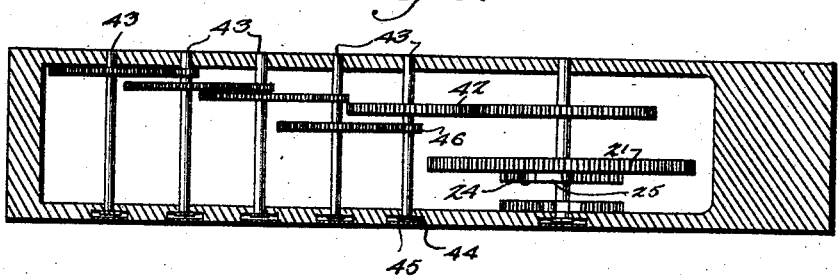
Figure 11:
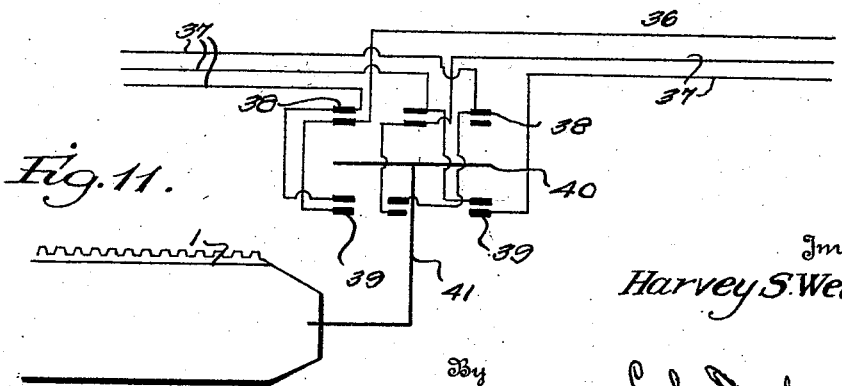

In the accompanying drawings I have shown one embodiment of the invention. In this showing, Figure 1 is a front elevation of the scale beam and associated parts, Figure 2 is a vertical sectional view on line 2—2 of Figure 1, Figure 3 is a similar view on line 3—3 of Figure 1, Figure 4 is a vertical sectional view on line 4—4 of Figure 3, Figure 5 is a horizontal sectional view on line 5—5 of Figure 1, Figure 6 is a detail sectional view through the main shaft of the indicating and totalizing mechanism, Figure 7 is a vertical sectional view on line 7—7 of Figure 4, Figure 8 is a similar view on line 8—8 of Figure 4, Figure 9 is a similar view on line 9—9 of Figure 4, Figure 10 is a horizontal sectional view on line 10—10 of Figure 1 showing the totalizing gear train, and Figure 11 is an enlarged view of the switch by means of which the mechanism is automatically controlled.

Referring to the drawings, the reference numeral 1 designates a scale beam which is provided with knife edges 2 by means of which it is adapted to be supported and connected to the scale platform (not shown) by means of suitable levers (not shown) in the ordinary manner. At the inner end of the beam I provide an arm 3 adapted to support a horizontal shelf or bracket 4. A motor 5 is arranged thereon and a pinion 6 is mounted on the motor shaft 7. The upper end of the arm 3 is provided with a depending portion 8 arranged substantially parallel to the body portion and a stub shaft 9 is journaled between these two members. This shaft is adapted to support a gear 10 meshing with the pinion 6 and is further provided with a pinion 11 meshing with a gear 12 mounted on a shaft 13. As shown, the shaft 13 is journaled in the arm 3 and the outer end of the shaft is mounted in a bearing carried by an arm 14 depending from the outer end of the beam. Intermediate its ends this shaft is threaded as at 15.

A weight 16 is mounted on the scale beam and is adapted to be moved along the beam until it balances the weight on the platform in the usual manner. As shown the upper face of the beam is provided with a rack 17 and adjacent each corner the weight is provided with a roller 18 adapted to ride on the beam. The weight embraces the beam as shown in Figures 4 and 7 to 9 inclusive and beneath the beam it is provided with a pair of depending portions 19 having threaded openings therein for the reception of the threaded portion of the shaft 13. Within the weight I provide a main shaft 20 and a main gear 21 is loosely mounted on this shaft. Beside the gear I provide a ratchet wheel 22 keyed to the shaft as at 23 (see Figure 6) and on the side of the main gear I provide a pawl 24 adapted to be held in operative position by means of a spring 25 and adapted to lock the main gear to the shaft when the gear is revolved in a clockwise direction.

The indicating mechanism consists of a plurality of shafts 26 arranged adjacent the top of the casing and provided with disks 27 on their forward ends. These disks are arranged in openings 28 and are adapted to indicate the position of the weight on the beam, and thus the amount of material on the scale platform, in the usual manner. As shown, each shaft is provided with a gear 29, one of which meshes with the main gear 21 and each shaft is provided with a pinion 30 by means of which the shaft to the left is driven. The ratio between the gears 29 and the pinions 30 is such that each shaft will make ten revolutions to one revolution of the next adjacent shaft to properly transfer the amounts indicated from units into tens and thence into hundreds in the usual manner.

As the totalizing mechanism is adapted to function only when the weight moves outwardly on the beam I provide an auxiliary gear 31 which is mounted on the main shaft gear and keyed thereto as at 32 (see Figure 6). I further provide a ratchet 33 on the main shaft mounted adjacent one side of the weight and keyed to the shaft as at 34. This ratchet is adapted to be engaged by a pawl 35 carried by the gear casing and is opposed to the action of the ratchet 22 heretofore described.

Any suitable type of electric switch may be employed for connecting the motor to a source of current when the weight is unbalanced on the beam. In the drawings, I have shown a three-phase circuit in which the wires 36 are connected to a source of current and the wires 37 are connected to the motor. I further provide upper contacts 38 and lower contacts 39 adapted to be bridged by a movable contact member 40 carried by the beam. This movable contact member is supported by an arm 41 of suitable insulating material.

The operation of the device is as follows:
When the weight is unbalanced on the beam, the beam moves either upwardly or downwardly to close one set of contacts and actuate the motor 5. The motor is of a reversible type and is adapted to revolve the shaft in either direction. Revolution of the shaft causes the main gear 21 to be revolved by the rack 17 and any movement of this gear is transmitted to the indicating mechanism through the gear 29 meshing therewith. Thus any movement of the weight on the beam in either direction will be transmitted to the indicating mechanism and the indicating mechanism will at all times tell the weight of the material on the scale platform. When the gear 21 revolves in a clockwise direction due to the weight moving outwardly on the scale beam, the pawl 24 drives the ratchet wheel 22 which is keyed to the main shaft causing the main shaft 20 to revolve and thus revolving the gear 31. This gear meshes with a gear 42 mounted on the adjacent shaft 43 of the totalizing mechanism. As shown, the totalizing mechanism is mounted on a plurality of shafts 43 arranged beneath the indicating mechanism and these shafts extend through openings 44 in the front of the casing and are provided with disks 45 having suitable indicia thereon for recording the totals weighed. Each shaft is provided with a gear 42 and is further provided with a pinion 46 meshing with the gear of the adjacent shaft to give the proper ratio for transfer.

When the gear 31 revolves due to the movement of the weight outwardly on the beam the total is thus added to the total then registering on the totalizing mechanism. When the weight moves inwardly on the beam the main gear 21 is revolved in a counter clockwise direction and the pawl 24 rides over the ratchet 22. The main shaft 20 is thus not actuated and the totaling mechanism is not moved.

The ratchet 33 and the pawl 35, which are opposed to the ratchet 22 and the pawl 24 lock the shaft 20 when the weight is moving inwardly of the scale beam to prevent the totalizing mechanism from turning, thus eliminating any possibility of the totalizing mechanism being actuated in a reverse direction to change the figures of the totals weighed.

The scale is adapted for use in various ways and may be employed in connection with weigh larries supplying coal to boilers in steam plants, in loading bulk cargoes in ships and at coal mines to check the amount of coal sent out.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. In a device of the character described, a beam, a weight automatically movable on said beam, an indicating gear train carried by said weight and adapted to be actuated by movement of the weight in either direction, and a totalizing gear train carried by the weight and adapted to be actuated by movement thereof in one direction.

2. In a device of the character described, a pivoted beam, a weight movably mounted on said beam, a switch adapted to be closed when the beam is unbalanced, a motor controlled by said switch, a threaded shaft connected to said motor and engaging said weight to move it on said beam, an indicating gear train carried by said weight and adapted to be actuated by movement of said weight in either direction, and a totalizing gear train adapted to be actuated by movement of the weight in one direction.

3. In a device of the character described, a beam, a weight movably mounted on said beam, a rack carried by said beam, a main shaft mounted in said weight, an indicating gear train mounted in said weight, a gear loosely mounted on said main shaft and meshing with said rack and said indicating gear train, means for locking said gear to said shaft when the gear revolves in one direction, and a totalizing gear train connected to said shaft and adapted to be actuated thereby.

4. In a device of the character described, a beam, a weight movably mounted on said beam, a rack carried by said beam, a main shaft mounted in said weight, a gear loosely mounted on said shaft and meshing with said rack, indicating mechanism carried by said weight and operatively connected to said gear to be actuated thereby, a ratchet wheel keyed to said shaft, a pawl carried by said gear and adapted to engage said ratchet wheel to lock said gear to said shaft when the gear revolves in one direction, and totalizing mechanism operatively connected to said shaft to be actuated thereby.

5. A device constructed in accordance with claim 3 wherein means are provided for locking said shaft against revolution in a reverse direction.

6. A device constructed in accordance with claim 4 wherein means are provided for locking said shaft against revolution in a reverse direction.

In testimony whereof I affix my signature.

HARVEY SIMONS WELCH, Jr.